US011977401B2

(12) United States Patent
Ma (10) Patent No.: US 11,977,401 B2
(45) Date of Patent: May 7, 2024

(54) POWER SUPPLY SOFT-START CONTROL METHOD, CONTROL APPARATUS AND CONTROL DEVICE, AND STORAGE MEDIUM

(71) Applicant: GUANGDONG INSPUR SMART COMPUTING TECHNOLOGY CO., LTD., Guangdong (CN)

(72) Inventor: Wenchao Ma, Guangdong (CN)

(73) Assignee: GUANGDONG INSPUR SMART COMPUTING TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/921,850

(22) PCT Filed: Jan. 25, 2021

(86) PCT No.: PCT/CN2021/073475
§ 371 (c)(1),
(2) Date: Oct. 27, 2022

(87) PCT Pub. No.: WO2021/238266
PCT Pub. Date: Dec. 2, 2021

(65) Prior Publication Data
US 2023/0161363 A1   May 25, 2023

(30) Foreign Application Priority Data
May 28, 2020  (CN) .......................... 202010469693.4

(51) Int. Cl.
*G05F 1/46*       (2006.01)
*H02M 1/00*       (2006.01)
(52) U.S. Cl.
CPC .......... *G05F 1/468* (2013.01); *H02M 1/0012* (2021.05); *H02M 1/0025* (2021.05)

(58) Field of Classification Search
None
See application file for complete search history.

(56) References Cited

U.S. PATENT DOCUMENTS 5,778,237 A * 7/1998 Yamamoto .............. G06F 1/324
                                                713/340
6,856,103 B1   2/2005 Hudson et al.
(Continued)

FOREIGN PATENT DOCUMENTS

| CN | 101084621 A | 12/2007 |
| CN | 102573197 A | 7/2012 |

(Continued)

OTHER PUBLICATIONS

Song changjiang, "Principle Analysis of Slow Start Circuit of Power Supply", Version 1, Oct. 10, 2009, 11 pages.
(Continued)

*Primary Examiner* — Thomas J. Hiltunen
(74) *Attorney, Agent, or Firm* — Cooper Legal Group, LLC (57) ABSTRACT

A power supply soft-start control method, control apparatus and control device, and a storage medium. Frequency adjustment is added to a power supply soft-start process. A voltage step value is utilized to control a voltage adjusting loop to perform voltage feedback adjustment, and a frequency step value is utilized to control a frequency adjusting loop to perform frequency feedback adjustment. In an adjusting process, according to a voltage set value of the voltage adjusting loop and a frequency set value of the frequency adjusting loop, one of the voltage adjusting loop and the frequency adjusting loop is selected to control a soft-start output voltage, whereby voltage adjustment and frequency adjustment are mutually restricted.

20 Claims, 3 Drawing Sheets

(56) References Cited

U.S. PATENT DOCUMENTS

| | | | | |
|---|---|---|---|---|
| 8,922,181 | B2* | 12/2014 | Yamaura | H02M 1/36 323/283 |
| 9,941,805 | B2* | 4/2018 | Yan | H02M 3/3376 |
| 10,250,252 | B2* | 4/2019 | Chiu | H03K 17/063 |
| 11,251,703 | B2* | 2/2022 | Lynch | H02M 3/158 |
| 11,258,368 | B2* | 2/2022 | Jiang | H02M 1/0016 |
| 2003/0212916 | A1 | 11/2003 | Ito et al. | |
| 2014/0191734 | A1 | 7/2014 | Kuang et al. | |
| 2021/0296999 | A1* | 9/2021 | Taleb | H02J 7/00 |
| 2023/0299663 | A1* | 9/2023 | Liu | H02M 1/36 363/49 |

FOREIGN PATENT DOCUMENTS

| | | |
|---|---|---|
| CN | 103049066 A | 4/2013 |
| CN | 106707245 A | 5/2017 |
| CN | 110380601 A | 10/2019 |
| CN | 110492755 A | 11/2019 |
| CN | 111082649 A | 4/2020 |
| CN | 111736680 A | 10/2020 |
| WO | 2015143720 A1 | 10/2015 |

OTHER PUBLICATIONS

"Enhanced, High-Efficiency Power Factor Controller NCP1622", www.onsemi.com, Aug. 2021, Rev. 5, 21 pages.

International Search Report of corresponding PCT application PCT/CN2021/073475, dated Apr. 15, 2021, 7 pages.

Written Opinion of corresponding PCT application PCT/CN2021/073475, dated Apr. 15, 2021, 9 pages.

First Office Action of corresponding CN priority application CN202010469693.4, dated Aug. 4, 2021, 12 pages.

"Enhanced, High-Efficiency Power Factor Controller", http://www.icbase.com/pdf/ONS/ONS51381209.PDF, NCP1612, full text, Dec. 31, 2017.

Changjiang, Song, zyongwxiaj8, https://max.book118.com/html/2017/0415/100381412.shtm,Apr. 18, 2017.

* cited by examiner

Fig. 3

POWER SUPPLY SOFT-START CONTROL METHOD, CONTROL APPARATUS AND CONTROL DEVICE, AND STORAGE MEDIUM

This application claims priority to Chinese Patent Application No. 202010469693.4, filed on May 28, 2020 in China Patent Office and entitled "Power Supply Soft-Start Control Method, Control Apparatus and Control Device, and Storage Medium", which is hereby incorporated by reference in its entirety.

FIELD

The present disclosure relates to the technical field of power supply control, in particular to a power supply soft-start control method, control apparatus and control device, and a storage medium.

BACKGROUND

Most existing electronic systems support hot-swap functions. In order to avoid large damage to the systems caused by hot-swap, inrush current generated by powering on is reduced by setting soft-start of a power supply. The power supply of the electronic system has strict requirements for soft-start time and start-up inrush current. For example, a server power supply CRPS needs to finish the establishment of a voltage of 12 V within a few tens of milliseconds and ensure a small inrush current. The stability of power supply soft-start determines the index level of a soft-start process of the power supply, and further affects the stability of the entire power supply.

At present, a server power supply resonance circuit (LLC) usually adopts a while cycle mode. In a cycle process, a voltage set value of a voltage adjusting loop is controlled to gradually increase from 0 V to 12 V. When a voltage of 12 V is established, the entire soft-start process ends. Then a pulse width modulation (PWM) circuit starts to control, whereby the phenomenon of voltage fluctuation will occur at the end of soft-start, thereby affecting the stability of the soft-start process.

SUMMARY

An object of the present disclosure is to provide a power supply soft-start control method, control apparatus and control device, and a storage medium, which are configured to improve the stability of a soft-start process of a power supply and reduce voltage fluctuation at the end of soft-start.

In order to solve the above technical problem, the present disclosure provides a power supply soft-start control method, including:
  obtaining a voltage step value and a frequency step value;
  utilizing the voltage step value to control a voltage adjusting loop to perform voltage feedback adjustment, and utilizing the frequency step value to control a frequency adjusting loop to perform frequency feedback adjustment;
  obtaining a voltage set value of the voltage adjusting loop and a frequency set value of the frequency adjusting loop, converting the frequency set value into a first set value according to a preset rule, and converting the voltage set value into a second set value having the same measuring unit as the first set value;
  when the first set value is greater than or equal to the second set value, utilizing the voltage adjusting loop to control a soft-start output voltage; and when the second set value is greater than the first set value, utilizing the frequency adjusting loop to control the soft-start output voltage; and
  when the soft-start output voltage is greater than or equal to a preset soft-start voltage, determining that the soft-start is finished.

Optionally, the utilizing the voltage step value to control a voltage adjusting loop to perform voltage feedback adjustment and utilizing the frequency step value to control a frequency adjusting loop to perform frequency feedback adjustment specifically includes:
  updating a reference voltage value of the voltage adjusting loop according to the voltage step value, and synchronously updating a reference frequency value of a PWM period register according to the frequency step value.

Optionally, before utilizing the voltage step value to control a voltage adjusting loop to perform voltage feedback adjustment and utilizing the frequency step value to control a frequency adjusting loop to perform frequency feedback adjustment, the method further includes:
  setting the reference voltage value of the voltage adjusting loop to 0, and setting the reference frequency value of the PWM period register to a minimum value.

Optionally, the utilizing the voltage step value to control a voltage adjusting loop to perform voltage feedback adjustment and utilizing the frequency step value to control a frequency adjusting loop to perform frequency feedback adjustment specifically includes:
  when detecting an on flag bit as 1, utilizing the voltage step value to control the voltage adjusting loop to perform voltage feedback adjustment, and utilizing the frequency step value to control the frequency adjusting loop to perform frequency feedback adjustment.

Optionally, the method further includes:
  adjusting the frequency step value and the voltage step value according to an execution duration of the soft-start and a target soft-start duration.

Optionally, adjusting the frequency step value and the voltage step value according to an execution duration of the soft-start specifically includes:
  when a control duration of the frequency adjusting loop is lower than a first preset duration, reducing the frequency step value, otherwise increasing the frequency step value; and
  when a control duration of the voltage adjusting loop is lower than a second preset duration, reducing the voltage step value, otherwise increasing the voltage step value.

Optionally, the adjusting the frequency step value and the voltage step value according to an execution duration of the soft-start specifically includes:
  adjusting the frequency step value and the voltage step value according to the execution duration of the soft-start, whereby the soft-start is controlled by the voltage adjusting loop and the frequency adjusting loop in sequence.

In order to solve the above technical problem, the present disclosure also provides a power supply soft-start control apparatus, including:
  a first obtaining unit, configured to obtain a voltage step value and a frequency step value;
  a control unit, configured to utilize the voltage step value to control a voltage adjusting loop to perform voltage feedback adjustment, and utilize the frequency step value to control a frequency adjusting loop to perform frequency feedback adjustment;

a second obtaining unit, configured to obtain a voltage set value of the voltage adjusting loop and a frequency set value of the frequency adjusting loop, convert the frequency set value into a first set value according to a preset rule, and convert the voltage set value into a second set value having the same measuring unit as the first set value;

a switching unit, configured to, when the first set value is greater than or equal to the second set value, utilize the voltage adjusting loop to control a soft-start output voltage, and when the second set value is greater than the first set value, utilize the frequency adjusting loop to control the soft-start output voltage; and a detection unit, configured to, when the soft-start output voltage is greater than or equal to a preset soft-start voltage, determine that the soft-start is finished.

In order to solve the above technical problem, the present disclosure also provides a power supply soft-start control device, including:

a memory, configured to store instructions including the steps of the power supply soft-start control method described in any one of the above; and a processor, configured to execute the instructions.

In order to solve the above technical problem, the present disclosure also provides a storage medium, having a computer program stored thereon. The computer program, when executed by a processor, implements the steps of the power supply soft-start control method described in any one of the above.

According to the power supply soft-start control method provided in the present disclosure, frequency adjustment is added to a power supply soft-start process. A voltage step value is utilized to control a voltage adjusting loop to perform voltage feedback adjustment, and a frequency step value is utilized to control a frequency adjusting loop to perform frequency feedback adjustment. In an adjusting process, a voltage set value of the voltage adjusting loop and a frequency set value of the frequency adjusting loop are obtained and respectively converted into a second set value and a first set value having the same measuring unit. The voltage adjusting loop is utilized to control a soft-start output voltage when the first set value is greater than or equal to the second set value, and the frequency adjusting loop is utilized to control the soft-start output voltage when the second set value is greater than the first set value, whereby voltage adjustment and frequency adjustment are mutually restricted. In the prior art, when soft-start is finished, due to the fact that the pulse width modulation frequency is calculated from the initial frequency, the phenomenon of voltage fluctuation can be caused at the moment when soft-start is finished, and the stability of the soft-start process is affected. In the present disclosure, frequency adjustment is involved in the soft-start process, so that the stability of soft-start of a power supply is effectively improved, and voltage fluctuation generated when soft-start is finished is reduced.

The present disclosure also provides a power supply soft-start control apparatus and control device, and a storage medium, which have the above beneficial effects.

BRIEF DESCRIPTION OF THE DRAWINGS

In order to more clearly illustrate the technical solutions in the embodiments of the present invention or the prior art, the drawings needing to be used in the description of the embodiments or the prior art will be briefly introduced below. It is obvious that the drawings in the following description are merely some embodiments of the present invention, and a person of ordinary skill in the art may also obtain other drawings according to these drawings without involving any inventive effort.

DETAILED DESCRIPTION

A core of the present disclosure is to provide a power supply soft-start control method, control apparatus and control device, and a storage medium, which are configured to improve the stability of a soft-start process of a power supply and reduce voltage fluctuation at the end of soft-start.

The technical solutions in the embodiments of the present disclosure will be described clearly and completely below in combination with the drawings in the embodiments of the present disclosure. Clearly, the described embodiments are not all but only part of embodiments of the present disclosure. Based on the embodiments of the present invention, all other embodiments obtained by those skilled in the art without creative work shall fall within the protection scope of the present invention.

Figure 1:
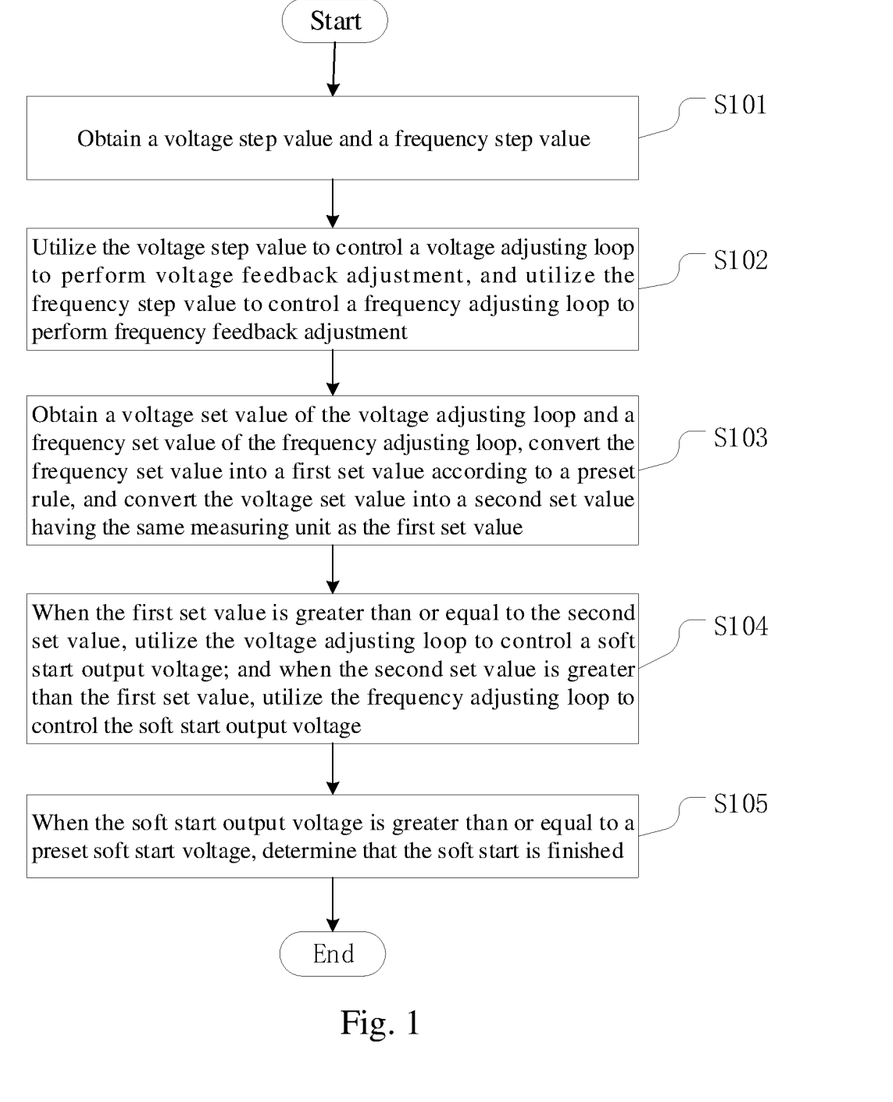
FIG. 1 is a flowchart of a power supply soft-start control method according to an embodiment of the present disclosure.

FIG. 1 is a flowchart of a power supply soft-start control method according to an embodiment of the present disclosure.

As shown in FIG. 1, the power supply soft-start control method according to an embodiment of the present disclosure includes:

S101: Obtain a voltage step value and a frequency step value.

The steps provided in the embodiment of the present disclosure are implemented based on a power supply controller.

In the embodiment of the present disclosure, a power supply soft-start process is a process of voltage stepping and frequency stepping. The power supply controller receives a voltage step value and a frequency step value input by an operator to perform voltage adjustment and frequency adjustment. The voltage step value and the frequency step value may both adopt a reference value, and may also obtain suitable values through simulation for the soft-start process of different types of power supplies.

S102: Utilize the voltage step value to control a voltage adjusting loop to perform voltage feedback adjustment, and utilize the frequency step value to control a frequency adjusting loop to perform frequency feedback adjustment.

In specific implementation, a reference voltage value (VrefSoft) of the voltage adjusting loop is updated according to the voltage step value, and a reference frequency value (PTPER) of a PWM period register is synchronously updated according to the frequency step value.

Before soft-start begins, a power supply is in a power-off state. Then, before step S102, the method further includes the following steps.

The reference voltage value of the voltage adjusting loop is set to 0, and the reference frequency value of the PWM period register is set to a minimum value, so as to obtain a maximum output frequency and to disable a PWM module.

The voltage step value is utilized to control the voltage adjusting loop to perform voltage feedback adjustment. That is, for the reference voltage value of the voltage adjusting loop starting from 0, the voltage step value is increased at a certain rate, so as to obtain a new reference voltage value. Then, the voltage adjusting loop performs voltage adjustment according to the new reference voltage value. The frequency step value is utilized to control the frequency adjusting loop to perform frequency feedback adjustment. That is, for the reference frequency value of the frequency adjusting loop starting from the maximum value, the frequency step value is increased synchronously with the control of the voltage step value, so as to obtain a new reference frequency value. Then, the frequency adjusting loop performs frequency adjustment according to the new reference frequency value.

When a system has an on instruction, an on flag bit would be set to 1. The system enters an on state and soft-start begins after detecting the on flag bit as 1. At this moment, the voltage step value is utilized to control the voltage adjusting loop to perform voltage feedback adjustment, and the frequency step value is utilized to control the frequency adjusting loop to perform frequency feedback adjustment.

S103: Obtain a voltage set value of the voltage adjusting loop and a frequency set value of the frequency adjusting loop, convert the frequency set value into a first set value according to a preset rule, and convert the voltage set value into a second set value having the same measuring unit as the first set value.

S104: When the first set value is greater than or equal to the second set value, utilize the voltage adjusting loop to control a soft-start output voltage, and when the second set value is greater than the first set value, utilize the frequency adjusting loop to control the soft-start output voltage.

During the execution of step S102, one of the voltage adjusting loop and the frequency adjusting loop needs to be selected to control a soft-start output voltage. In order to ensure the stability of the soft-start process of the power supply, voltage adjustment and frequency adjustment should be balanced, and a mechanism should be set to measure the relationship between voltage adjustment and frequency adjustment.

As described in step S103, after respectively sampling a voltage set value of the voltage adjusting loop and a frequency set value of the frequency adjusting loop according to a preset sampling frequency, the frequency set value is converted into a first set value according to a preset rule, and the voltage set value is converted into a second set value having the same measuring unit as the first set value, whereby voltage adjustment and frequency adjustment are compared.

As described in step S104, when the first set value is greater than or equal to the second set value, it is indicated that a frequency adjustment rate is too high. Then, the voltage adjusting loop is utilized to control the soft-start output voltage. When the second set value is greater than the first set value, it is indicated that a voltage adjustment rate is too high. Then, the frequency adjusting loop is utilized to control the soft-start output voltage.

S105: When the soft-start output voltage is greater than or equal to a preset soft-start voltage, determine that the soft-start is finished.

The soft-start output voltage is detected. When the soft-start output voltage is greater than or equal to a preset soft-start voltage (for example, a server power supply is usually 12 V), it is determined that the soft-start is finished.

According to the power supply soft-start control method provided in the embodiments of present disclosure, frequency adjustment is added to a power supply soft-start process. A voltage step value is utilized to control a voltage adjusting loop to perform voltage feedback adjustment, and a frequency step value is utilized to control a frequency adjusting loop to perform frequency feedback adjustment. In an adjusting process, a voltage set value of the voltage adjusting loop and a frequency set value of the frequency adjusting loop are obtained and respectively converted into a second set value and a first set value having the same measuring unit. The voltage adjusting loop is utilized to control a soft-start output voltage when the first set value is greater than or equal to the second set value, and the frequency adjusting loop is utilized to control the soft-start output voltage when the second set value is greater than the first set value, whereby voltage adjustment and frequency adjustment are mutually restricted. In the prior art, when soft-start is finished, due to the fact that the pulse width modulation frequency is calculated from the initial frequency, the phenomenon of voltage fluctuation can be caused at the moment when soft-start is finished, and the stability of the soft-start process is affected. In the present disclosure, frequency adjustment is involved in the soft-start process, so that the stability of soft-start of a power supply is effectively improved, and voltage fluctuation generated when soft-start is finished is reduced.

On the basis of the above embodiment, in an embodiment of the present disclosure, the power supply soft-start control method further includes:

adjust the frequency step value and the voltage step value according to an execution duration of the soft-start and a target soft-start duration.

In order to meet the requirements for voltage stability and soft-start duration of power supply soft-start, for different types and models of power supplies, the frequency step value and the voltage step value are adjusted according to an execution duration of the soft-start and a target soft-start duration.

In specific implementation, a simulation test may be performed before a power supply is put into use, an output voltage waveform is received at an output end of the power supply, and the change situation of an output voltage in the soft-start process is viewed through an oscilloscope, whereby the frequency step value and the voltage step value are adjusted.

The operation of adjusting the frequency step value and the voltage step value according to an execution duration of the soft-start may specifically include the following steps.

The frequency step value is reduced when a control duration of the frequency adjusting loop is lower than a first preset duration, otherwise the frequency step value is increased. The voltage step value is reduced when a control duration of the voltage adjusting loop is lower than a second preset duration, otherwise the voltage step value is increased.

A control ratio of the frequency adjusting loop and the voltage adjusting loop is controlled by setting a first preset duration and a second preset duration. The first preset duration and the second preset duration may be obtained by multiplying a target soft-start duration by a certain proportion.

In addition, an ideal setting result of the frequency step value and the voltage step value is that by means of simulation adjusting, the frequency step value and the voltage step value are adjusted according to the execution duration of the soft-start, whereby the soft-start is controlled by the voltage adjusting loop and the frequency adjusting loop in sequence. Specifically, the first half of the soft-start process may be controlled by the voltage adjusting loop while the second half is controlled by the frequency adjusting loop, or other control time proportions may be set.

Various embodiments corresponding to the power supply soft-start control method are detailed in detail above. On this basis, the present disclosure also discloses a power supply soft-start control apparatus and device, and a storage medium, corresponding to the above method.

Figure 2:
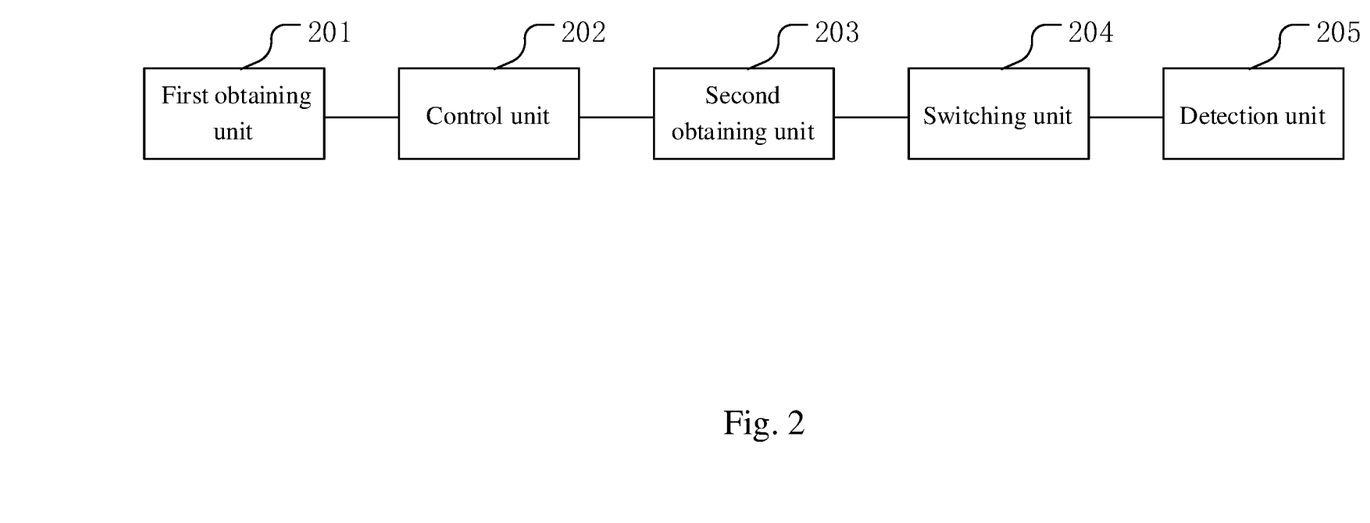
FIG. 2 is a schematic structural diagram of a power supply soft-start control apparatus according to an embodiment of the present disclosure.

FIG. 2 is a schematic structural diagram of a power supply soft-start control apparatus according to an embodiment of the present disclosure.

As shown in FIG. 2, the power supply soft-start control apparatus according to an embodiment of the present disclosure includes:

- a first obtaining unit 201, configured to obtain a voltage step value and a frequency step value;
- a control unit 202, configured to utilize the voltage step value to control a voltage adjusting loop to perform voltage feedback adjustment, and utilize the frequency step value to control a frequency adjusting loop to perform frequency feedback adjustment;
- a second obtaining unit 203, configured to obtain a voltage set value of the voltage adjusting loop and a frequency set value of the frequency adjusting loop, convert the frequency set value into a first set value according to a preset rule, and convert the voltage set value into a second set value having the same measuring unit as the first set value;
- a switching unit 204, configured to, when the first set value is greater than or equal to the second set value, utilize the voltage adjusting loop to control a soft-start output voltage, and when the second set value is greater than the first set value, utilize the frequency adjusting loop to control the soft-start output voltage; and
- a detection unit 205, configured to, when the soft-start output voltage is greater than or equal to a preset soft-start voltage, determine that the soft-start is finished.

The embodiment of the apparatus part is in mutual correspondence with the embodiment of the method part. Therefore, the embodiment of the apparatus part refers to the descriptions about the embodiment of the method part, and will not be elaborated temporarily herein.

Figure 3:
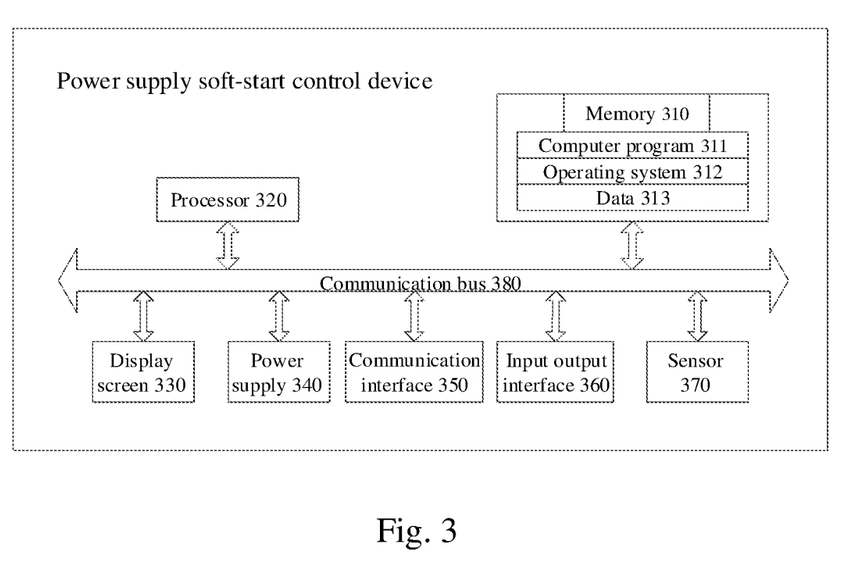
FIG. 3 is a schematic structural diagram of a power supply soft-start control device according to an embodiment of the present disclosure.

FIG. 3 is a schematic structural diagram of a power supply soft-start control device according to an embodiment of the present disclosure.

As shown in FIG. 3, the power supply soft-start control device according to an embodiment of the present disclosure includes:

- a memory 310, configured to store instructions including the steps of the power supply soft-start control method described in any one of the above embodiments; and
- a processor 320, configured to execute the instructions.

The processor 320 may include one or more processing cores, such as a 3-core processor and an 8-core processor. The processor 320 may be implemented in at least one form of hardware in a digital signal processing (DSP), a field-programmable gate array (FPGA), and a programmable logic array (PLA). The processor 320 may also include a main processor and a co-processor. The main processor is a processor for processing data in a wake-up state, also referred to as a central processing unit (CPU). The co-processor is a low-power processor for processing data in a standby state. In some embodiments, the processor 320 may be integrated with a graphics processing unit (GPU). The GPU is responsible for rendering and drawing the content to be displayed on a display screen. In some embodiments, the processor 320 may also include an artificial intelligence (AI) processor for processing computing operations related to machine learning.

The memory 310 may include one or more storage media, which may be non-transitory. The memory 310 may also include a high-speed random access memory, and a non-volatile memory such as one or more magnetic disk storage devices and flash memory devices. In this embodiment, the memory 310 is configured to store at least a computer program 311. The computer program 311, after loaded and executed by the processor 320, is capable of implementing the relevant steps in the power supply soft-start control method disclosed in any one of the foregoing embodiments. In addition, resources stored in the memory 310 may also include an operating system 312 and data 313, etc. The storage may be transient storage or permanent storage. The operating system 312 may be Windows. The data 313 may include, but is not limited to, data involved in the above method.

In some embodiments, the power supply soft-start control device may also include a display screen 330, a power supply 340, a communication interface 350, an input output interface 360, a sensor 370, and a communication bus 380.

It will be appreciated by those skilled in the art that the structure shown in FIG. 3 does not constitute a limitation on the power supply soft-start control device and may include more or fewer components than those shown.

The power supply soft-start control device provided in the embodiment of the present disclosure includes a memory and a processor. The processor, when executing a program stored in the memory, is capable of implementing the power supply soft-start control method as described above. The same effect as above is achieved.

It should be noted that the apparatus and device embodiments described above are only schematic. For example, the division of the modules is only logic function division, and other division manners may be adopted in practical implementation. For example, a plurality of modules may be combined or integrated into another system, or some features may be omitted or not executed. In addition, the displayed or discussed mutual coupling or direct coupling or communication connection may be indirect coupling or communication connection, via some interfaces, of the apparatus or the modules, and may be electrical and mechanical or adopt other forms. The modules illustrated as separate components may or may not be physically separated, and the components shown as modules may or may not be physical modules, i.e. may be located in one place, or may be distributed over a plurality of network modules. Some or all of the modules may be selected according to actual needs to achieve the purpose of the solution of this embodiment.

In addition, each functional module in each embodiment of the present disclosure may be integrated into one processing module, each module may physically exist separately, and two or more modules may be integrated into one module. The above integrated modules may be implemented in the form of hardware or in the form of software functional modules.

The integrated module, if implemented in the form of software functional modules and sold or used as a stand-alone product, may be stored in a storage medium. Based on such an understanding, the technical solution of the present disclosure, in essence or in part contributing to the related art or in part, may be embodied in the form of a software product. The computer software product is stored in a storage medium to perform all or part of the steps of the method in each embodiment of the present disclosure.

In view of this, an embodiment of the present disclosure also provides a storage medium, having a computer program stored thereon. The computer program, when executed by a processor, implements the steps of the power supply soft-start control method.

The storage medium may include: a U disk, a removable hard disk, a read-only memory (ROM), a random access memory (RAM), a magnetic disk, or an optical disk, and other media which may store program codes.

The computer program included in the storage medium provided in this embodiment, when executed by the processor, is capable of implementing the steps of the power supply soft-start control method as described above. The same effect as above is achieved.

The power supply soft-start control method, control apparatus and control device and the storage medium provided in the present disclosure have been described in detail above. All the embodiments in this specification are described in a progressive manner. Contents mainly described in each embodiment are different from those described in other embodiments. Since the apparatus, the device and the storage medium disclosed in the embodiments correspond to the method disclosed in the embodiment, the descriptions therefor are relatively simple. The relevant parts may be described with reference to the method section. It should be noted that for a person of ordinary skill in the art, several improvements and modifications can be made to the present invention without departing from the principle of the present invention, and these improvements and modifications also fall within the scope of protection of the claims of the present invention.

It is also noted that in this specification, relationship terms such as first and second are used only to distinguish one entity or operation from another entity or operation, without necessarily requiring or implying any such actual relationship or order between those entities or operations. Further, the terms "include" "comprise" or any other variation thereof are intended to cover non-exclusive inclusion, so that a process, method, article, or apparatus that includes a set of elements includes not only those elements, but also other elements not expressly listed, or also include elements that are inherent to such process, method, article, or apparatus. Without further limitation, the elements defined by the statement "comprising a . . . " do not preclude the existence of additional identical elements in the process, method, article, or apparatus that include said elements.

What is claimed is:

1. A power supply soft-start control method, comprising:
   obtaining a voltage step value and a frequency step value;
   utilizing the voltage step value to control a voltage adjusting loop to perform voltage feedback adjustment, and utilizing the frequency step value to control a frequency adjusting loop to perform frequency feedback adjustment;
   obtaining a voltage set value of the voltage adjusting loop and a frequency set value of the frequency adjusting loop, converting the frequency set value into a first set value according to a preset rule, and converting the voltage set value into a second set value having a same measuring unit as the first set value;
   in response to determining that the first set value is greater than or equal to the second set value, utilizing the voltage adjusting loop to control a soft-start output voltage; and in response to determining that the second set value is greater than the first set value, utilizing the frequency adjusting loop to control the soft-start output voltage; and
   in response to determining that the soft-start output voltage is greater than or equal to a preset soft-start voltage, determining that a soft-start is finished.

2. The control method according to claim 1, wherein the utilizing the voltage step value to control a voltage adjusting loop to perform voltage feedback adjustment and utilizing the frequency step value to control a frequency adjusting loop to perform frequency feedback adjustment specifically comprises:
   updating a reference voltage value of the voltage adjusting loop according to the voltage step value, and synchronously updating a reference frequency value of a pulse width modulation (PWM) period register according to the frequency step value.

3. The control method according to claim 2, wherein before utilizing the voltage step value to control a voltage adjusting loop to perform voltage feedback adjustment and utilizing the frequency step value to control a frequency adjusting loop to perform frequency feedback adjustment, the method further comprises:
   setting the reference voltage value of the voltage adjusting loop to 0, and setting the reference frequency value of the PWM period register to a minimum value.

4. The control method according to claim 1, wherein the utilizing the voltage step value to control a voltage adjusting loop to perform voltage feedback adjustment and utilizing the frequency step value to control a frequency adjusting loop to perform frequency feedback adjustment specifically comprises:
   in response to detecting an on flag bit as 1, utilizing the voltage step value to control the voltage adjusting loop to perform voltage feedback adjustment, and utilizing the frequency step value to control the frequency adjusting loop to perform frequency feedback adjustment.

5. The control method according to claim 1, further comprising:
   adjusting the frequency step value and the voltage step value according to an execution duration of the soft-start and a target soft-start duration.

6. The control method according to claim 5, wherein the adjusting the frequency step value and the voltage step value according to an execution duration of the soft-start specifically comprises:
   in response to determining that a control duration of the frequency adjusting loop is lower than a first preset duration, reducing the frequency step value, otherwise increasing the frequency step value; and
   in response to determining that a control duration of the voltage adjusting loop is lower than a second preset duration, reducing the voltage step value, otherwise increasing the voltage step value.

7. The control method according to claim 5, wherein the adjusting the frequency step value and the voltage step value according to an execution duration of the soft-start specifically comprises:
   adjusting the frequency step value and the voltage step value according to the execution duration of the soft-start, whereby the soft-start is controlled by the voltage adjusting loop and the frequency adjusting loop in sequence.

8. A power supply soft-start control device, comprising:
a non-transitory memory, configured to store instructions thereon; and
a processor, configured to execute the instructions and implement a power supply soft-start control method;
wherein the power supply soft-start control method comprises:
obtaining a voltage step value and a frequency step value;
utilizing the voltage step value to control a voltage adjusting loop to perform voltage feedback adjustment, and utilizing the frequency step value to control a frequency adjusting loop to perform frequency feedback adjustment;
obtaining a voltage set value of the voltage adjusting loop and a frequency set value of the frequency adjusting loop, converting the frequency set value into a first set value according to a preset rule, and converting the voltage set value into a second set value having a same measuring unit as the first set value;
in response to determining that the first set value is greater than or equal to the second set value, utilizing the voltage adjusting loop to control a soft-start output voltage; and in response to determining that the second set value is greater than the first set value, utilizing the frequency adjusting loop to control the soft-start output voltage; and
in response to determining that the soft-start output voltage is greater than or equal to a preset soft-start voltage, determining that a soft-start is finished.

9. A non-transitory storage medium, having a computer program stored thereon, wherein the computer program, when executed by a processor, implements a power supply soft-start control method;
wherein the power supply soft-start control method comprises:
obtaining a voltage step value and a frequency step value;
utilizing the voltage step value to control a voltage adjusting loop to perform voltage feedback adjustment, and utilizing the frequency step value to control a frequency adjusting loop to perform frequency feedback adjustment;
obtaining a voltage set value of the voltage adjusting loop and a frequency set value of the frequency adjusting loop, converting the frequency set value into a first set value according to a preset rule, and converting the voltage set value into a second set value having a same measuring unit as the first set value;
in response to determining that the first set value is greater than or equal to the second set value, utilizing the voltage adjusting loop to control a soft-start output voltage; and in response to determining that the second set value is greater than the first set value, utilizing the frequency adjusting loop to control the soft-start output voltage; and
in response to determining that the soft-start output voltage is greater than or equal to a preset soft-start voltage, determining that a soft-start is finished.

10. The power supply soft-start control device according to claim 8, wherein the utilizing the voltage step value to control a voltage adjusting loop to perform voltage feedback adjustment and utilizing the frequency step value to control a frequency adjusting loop to perform frequency feedback adjustment specifically comprises:
updating a reference voltage value of the voltage adjusting loop according to the voltage step value, and synchronously updating a reference frequency value of a pulse width modulation (PWM) period register according to the frequency step value.

11. The power supply soft-start control device according to claim 10, wherein before utilizing the voltage step value to control a voltage adjusting loop to perform voltage feedback adjustment and utilizing the frequency step value to control a frequency adjusting loop to perform frequency feedback adjustment, the method further comprises:
setting the reference voltage value of the voltage adjusting loop to 0, and setting the reference frequency value of the PWM period register to a minimum value.

12. The power supply soft-start control device according to claim 8, wherein the utilizing the voltage step value to control a voltage adjusting loop to perform voltage feedback adjustment and utilizing the frequency step value to control a frequency adjusting loop to perform frequency feedback adjustment specifically comprises:
in response to detecting an on flag bit as 1, utilizing the voltage step value to control the voltage adjusting loop to perform voltage feedback adjustment, and utilizing the frequency step value to control the frequency adjusting loop to perform frequency feedback adjustment.

13. The power supply soft-start control device according to claim 8, wherein the power supply soft-start control method further comprises:
adjusting the frequency step value and the voltage step value according to an execution duration of the soft-start and a target soft-start duration.

14. The power supply soft-start control device according to claim 13, wherein the adjusting the frequency step value and the voltage step value according to an execution duration of the soft-start specifically comprises:
in response to determining that a control duration of the frequency adjusting loop is lower than a first preset duration, reducing the frequency step value, otherwise increasing the frequency step value; and
in response to determining that a control duration of the voltage adjusting loop is lower than a second preset duration, reducing the voltage step value, otherwise increasing the voltage step value.

15. The power supply soft-start control device according to claim 13, wherein the adjusting the frequency step value and the voltage step value according to an execution duration of the soft-start specifically comprises:
adjusting the frequency step value and the voltage step value according to the execution duration of the soft-start, whereby the soft-start is controlled by the voltage adjusting loop and the frequency adjusting loop in sequence.

16. The non-transitory storage medium according to claim 9, wherein the utilizing the voltage step value to control a voltage adjusting loop to perform voltage feedback adjustment and utilizing the frequency step value to control a frequency adjusting loop to perform frequency feedback adjustment specifically comprises:
updating a reference voltage value of the voltage adjusting loop according to the voltage step value, and synchronously updating a reference frequency value of a pulse width modulation (PWM) period register according to the frequency step value.

17. The non-transitory storage medium according to claim 16, wherein before utilizing the voltage step value to control a voltage adjusting loop to perform voltage feedback adjustment and utilizing the frequency step value to control a frequency adjusting loop to perform frequency feedback adjustment, the method further comprises:

setting the reference voltage value of the voltage adjusting loop to 0, and setting the reference frequency value of the PWM period register to a minimum value.

18. The non-transitory storage medium according to claim 9, wherein the utilizing the voltage step value to control a voltage adjusting loop to perform voltage feedback adjustment and utilizing the frequency step value to control a frequency adjusting loop to perform frequency feedback adjustment specifically comprises:

in response to detecting an on flag bit as 1, utilizing the voltage step value to control the voltage adjusting loop to perform voltage feedback adjustment, and utilizing the frequency step value to control the frequency adjusting loop to perform frequency feedback adjustment.

19. The non-transitory storage medium according to claim 9, wherein the power supply soft-start control method further comprises:

adjusting the frequency step value and the voltage step value according to an execution duration of the soft-start and a target soft-start duration.

20. The non-transitory storage medium according to claim 19, wherein the adjusting the frequency step value and the voltage step value according to an execution duration of the soft-start specifically comprises:

in response to determining that a control duration of the frequency adjusting loop is lower than a first preset duration, reducing the frequency step value, otherwise increasing the frequency step value; and in response to determining that a control duration of the voltage adjusting loop is lower than a second preset duration, reducing the voltage step value, otherwise increasing the voltage step value.

\* \* \* \* \*